L. PARMELEE.
Drill-Chucks.
No. 143,377. Patented September 30, 1873.
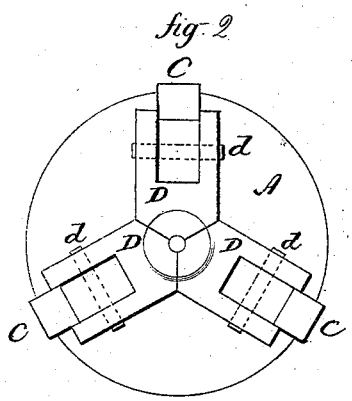
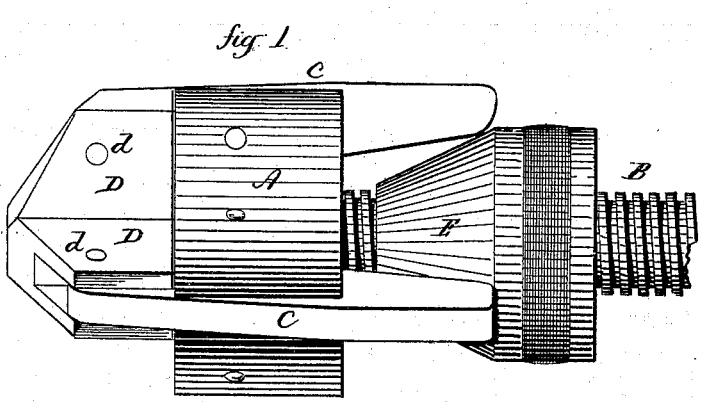
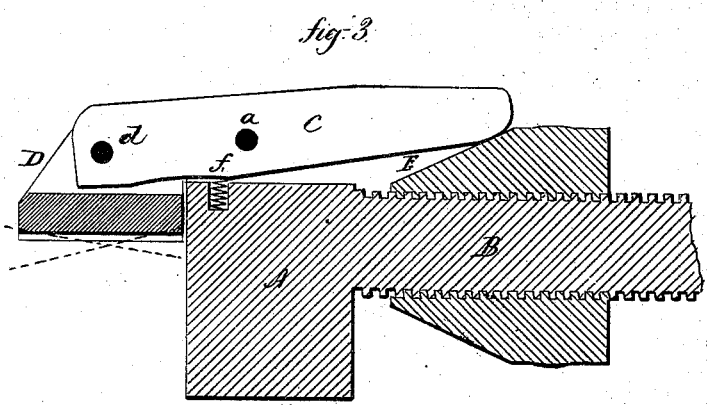
Witnesses
J. H. Shumway
A. J. Tibbits
Leander Parmelee
Inventor
By Atty.
John S. Earle

UNITED STATES PATENT OFFICE.

LEANDER PARMELEE, OF NEW HAVEN, CONNECTICUT, ASSIGNOR TO HIMSELF AND MERRITT HINE, OF SAME PLACE.

IMPROVEMENT IN DRILL-CHUCKS.

Specification forming part of Letters Patent No. 143,377, dated September 30, 1873; application filed May 28, 1873.

*To all whom it may concern:*

Be it known that I, LEANDER PARMELEE, of New Haven, in the county of New Haven and State of Connecticut, have invented a new Improvement in Drill-Chucks; and I do hereby declare the following, when taken in connection with the accompanying drawings and the letters of reference marked thereon, to be a full, clear, and exact description of the same, and which said drawings constitute part of this specification, and represent, in—

Figure 1, a side view; Fig. 2, an end view; and in Fig. 3, a longitudinal central section.

This invention relates to an improvement in that class of chucks designed for attachment to the mandrel of a lathe to hold the drill, or for other similar purposes, and commonly called drill-chucks; and the invention consists in the arrangement of two or more levers in a head, the forward end of each lever provided with a jaw pivoted to the lever, and combined with a conical sleeve or nut working under the opposite end of the levers to depress the said jaws radially or allow them to open.

A is the head of the chuck, attached to or made a part of a threaded spindle, B, which extends back and is fitted to the mandrel of the lathe. In this head A are arranged two or more levers, C, preferably three, pivoted in the head at *a*. Upon the forward end of each lever a jaw, D, is hung on a pivot, *d*. This jaw is free to swing upon the said pivot, so that the edge of the jaw may assume a position at an angle with the axis of the head or parallel therewith, as seen in Fig. 3. Upon the threaded spindle B a nut or sleeve, E, of conical shape, is placed, so as to be moved longitudinally by means of the thread on the spindle B. The inner extremity of the levers C rest upon this conical surface, so that by forcing the sleeve toward the head the end of the levers will be raised and the jaws depressed. Beneath the levers, forward of the pivot, a suitable spring, *f*, is arranged, the tendency of which is to force open the jaws when the sleeve E is withdrawn.

By pivoting the jaws D to the levers, as described, the jaws will, in closing, assume a position corresponding to the form of the thing to be clasped; that is to say, if the shank of the drill be tapering in either direction, the jaws will, swinging on their pivots, conform to that shape, so as to bear their full length upon the drill or thing to be held—an advantage which cannot be attained in chucks having parallel jaws.

I do not wish to be understood as claiming a drill-chuck having radially-moving jaws; but I do claim as my invention—

The head A, having two or more levers, C C, arranged therein as described, and provided with the spindle B, by means of which the head is secured in the lathe, and conical sleeve E, threaded to move longitudinally on the said spindle, combined with the jaws D, pivoted upon the forward end of the levers so as to swing longitudinally, all substantially as described.

LEANDER PARMELEE.

Witnesses:
A. J. TIBBITS,
J. H. SHUMWAY.